US012646974B1

(12) United States Patent
Cherry et al.

(10) Patent No.: US 12,646,974 B1
(45) Date of Patent: Jun. 2, 2026

(54) SYSTEMS AND METHODS FOR WIRELESS CHARGING OF INDUSTRIAL EQUIPMENT

(71) Applicant: Amazon Technologies, Inc., Seattle, WA (US)

(72) Inventors: Kevin Cherry, Robesonia, PA (US); Justin Stone, Frisco, TX (US); Larry Joe Robb, Mount Juliet, TN (US); Emily Vetterick, Seattle, WA (US); Ian Simpson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 728 days.

(21) Appl. No.: 18/064,583

(22) Filed: Dec. 12, 2022

(51) Int. Cl.
| | |
|---|---|
| *H02J 7/00* | (2026.01) |
| *H02J 50/00* | (2016.01) |
| *H02J 50/10* | (2016.01) |
| *H02J 50/40* | (2016.01) |
| *H02J 50/90* | (2016.01) |

(52) U.S. Cl.
CPC .......... *H02J 50/402* (2020.01); *H02J 50/005* (2020.01); *H02J 50/10* (2016.02); *H02J 50/90* (2016.02)

(58) Field of Classification Search
CPC ..... G01R 31/382; G01R 31/364; B60L 55/00; H02J 7/342; H02J 3/32
USPC ........................... 320/101, 103, 109; 701/22
See application file for complete search history.

(56) References Cited

U.S. PATENT DOCUMENTS

2019/0363578 A1* 11/2019 Hume ...................... H02J 7/04

* cited by examiner

*Primary Examiner* — Zixuan Zhou
(74) *Attorney, Agent, or Firm* — Eversheds Sutherland (US) LLP

(57) ABSTRACT

Systems, methods, and computer-readable media are disclosed for wireless charging of industrial equipment. In one embodiment, an example system may include a first mat configured to wirelessly charge a first device and a second device, the first mat having a first charging coil disposed in a first region of the first mat, and a second charging coil disposed in a second region of the first mat. The system may include a controller configured to determine, at a first time, that the first device is in contact with the first region of the first mat, and cause the first charging coil to be energized for wireless charging of the first device.

17 Claims, 9 Drawing Sheets

200

240

220

210

230

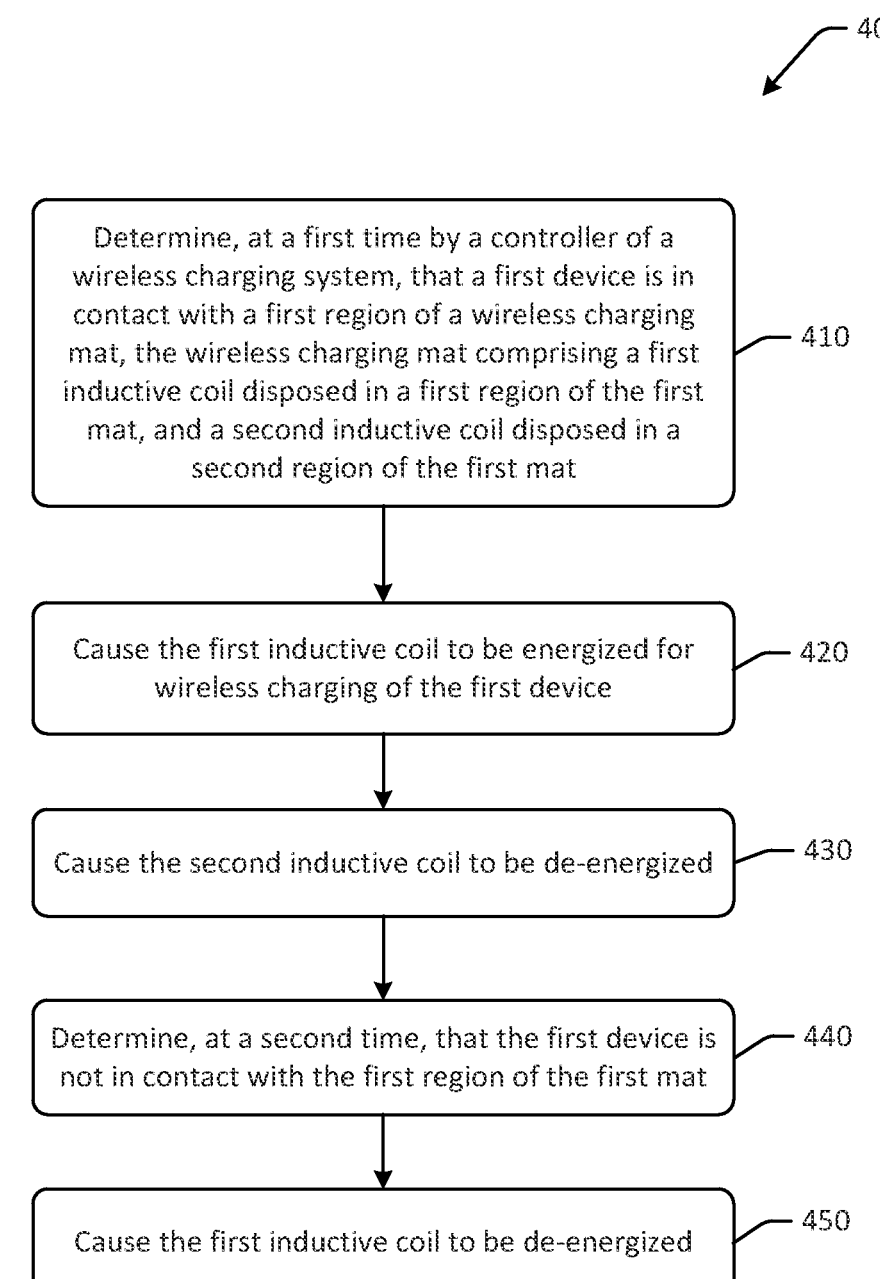

Determine, at a first time by a controller of a wireless charging system, that a first device is in contact with a first region of a wireless charging mat, the wireless charging mat comprising a first inductive coil disposed in a first region of the first mat, and a second inductive coil disposed in a second region of the first mat — 410

Cause the first inductive coil to be energized for wireless charging of the first device — 420

Cause the second inductive coil to be de-energized — 430

Determine, at a second time, that the first device is not in contact with the first region of the first mat — 440

Cause the first inductive coil to be de-energized — 450

FIG. 4

SYSTEMS AND METHODS FOR WIRELESS CHARGING OF INDUSTRIAL EQUIPMENT

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, packing technology, and so forth may be desired, such that manual efforts can be redirected to different tasks.

BRIEF DESCRIPTION OF THE DRAWINGS

FIG. 4 is an example process flow diagram for wireless charging of industrial equipment in accordance with one or more embodiments of the disclosure.

Figure 1:
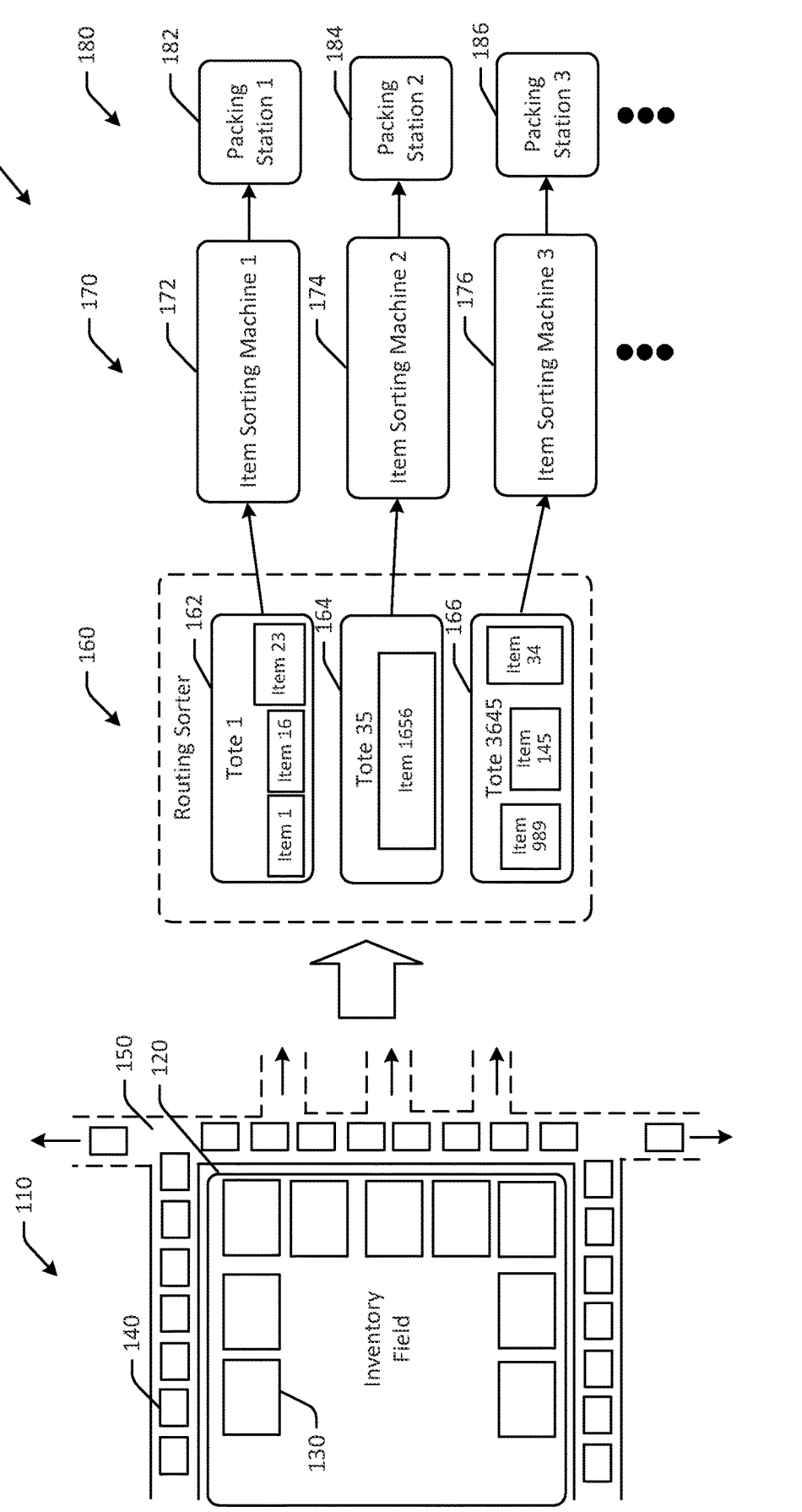
FIG. 1 is a hybrid schematic illustration of an example use case for wireless charging of industrial equipment in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. Moreover, fulfillment centers may include lengthy conveyors that may be used to transport objects, such as packages, products, items, or other objects. Such conveyors or similar systems may create potential chokepoints or bottlenecks in operation of the fulfillment center. For example, a jam at a particular point in a conveyor system may cause one or more entire portions of the conveyor to be paused. Similarly, load balancing, such as instances where pick rates exceed sort rates or pack rates for items may cause some or all of a conveyor system to be paused while loads are balanced. Moreover, reconfiguration of a fulfillment center layout may be costly and difficult due to material handling equipment, such as conveyor systems, that may be difficult to move.

To solve such issues, embodiments of the disclosure may include wireless charging systems configured to charge industrial equipment that may be used to transport items from one station or system of a fulfillment center to another, or perform other tasks in a fulfillment center, sortation center, or other facility environment. For example, bipedal or humanoid robots, autonomous guided vehicles, robotic manipulators, and other industrial equipment may be used to perform certain tasks, such as retrieving and/or transporting containers or items, sorting items, and so forth in a facility environment. Such industrial equipment may operate using rechargeable batteries. However, to avoid having to recharge such batteries at a dedicated time and/or in a dedicated space, embodiments of the disclosure may include one or more wireless charging systems that allow for charging of such batteries while the industrial equipment is performing its tasks, such as while a bipedal robot is transporting containers, etc. Such wireless charging systems may include charging mats that allow for charging of the batteries of the industrial equipment each time that an electrical contact of the robot or other equipment contacts the charging mat. For example, each time a bipedal robot steps on a charging mat, the bipedal robot may be charged via an electrical contact coupled to the leg(s) of the bipedal robot. The wireless charging systems may be safe for simultaneous human and robot use, and may prevent radio frequencies from escaping beyond an upper surface of the charging mat via use of a low profile electrical contact weave in the charging mat that prevents coupling with humans. Embodiments may include charging coils that can be selectively energized and/or de-energized, and may have configurable output voltage and/or wattage settings, so as to provide charging capabilities for different types of industrial equipment. Systems may be expandable to include additional or fewer charging mats depending on a desired amount of space to cover. As a result, throughput of the fulfillment center may be increased and overall efficiency may be improved. Although referred to herein as charging mats, embodiments may include charging tiles, charging rugs, and other form factors or configurations, and may be flexible in some instances, such that the charging mats can be rolled and unrolled for storage, etc.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, the mechanisms used to transport items, either individually or in groups, may be isolated in their unique silos and may not otherwise interact with each other. As a result, an additional step to connect any two such operations may be needed. For example, transporting items from a pick station to a sort station may require the item(s) to be picked into a container such as a tote which may then be handled manually or via an automated system to place it on a conveyor or similar transportation system that will carry the container to the sorting station. This increases the number of times an item is handled, and also increases a number of process steps, both of which can lead to increased defect rates. Additionally, different processes may run at different rates which may preclude the use of a common mechanism that can tie together all the different processes.

Embodiments of the disclosure include methods and systems for wireless charging of industrial equipment that may improve processing and fulfillment of orders. Certain embodiments include wireless charging systems that can be used to charge equipment while the equipment is being used throughout a fulfillment center. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for wireless charging of industrial equipment is depicted in accordance with one or more embodiments of the disclosure. Although discussed in the context of online orders, other embodiments may be directed to any suitable use case where objects are picked and released, such as instances where objects are picked from inventory, placed into containers, removed from containers for sorting, packed into boxes, and so forth.

In FIG. 1, a fulfillment center may be a traditional fulfillment center and may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, systems as described herein may be used to charge such robots and other equipment, such as equipment used to pick objects from conveyors, move the objects laterally, and place the retrieved objects into containers or onto other surfaces. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include portable conveyor assemblies and/or vehicles.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used or rechargeable industrial equipment is used, such as to pick items from inventory, place items in totes, remove items from totes, place items into bins, remove items from bins, place items into boxes for shipping, transport items, and so forth, wireless charging of industrial equipment systems and methods as described herein may be used. As a result, manual effort can be redirected to other tasks.

Embodiments of the disclosure include systems and methods for wireless charging of industrial equipment. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
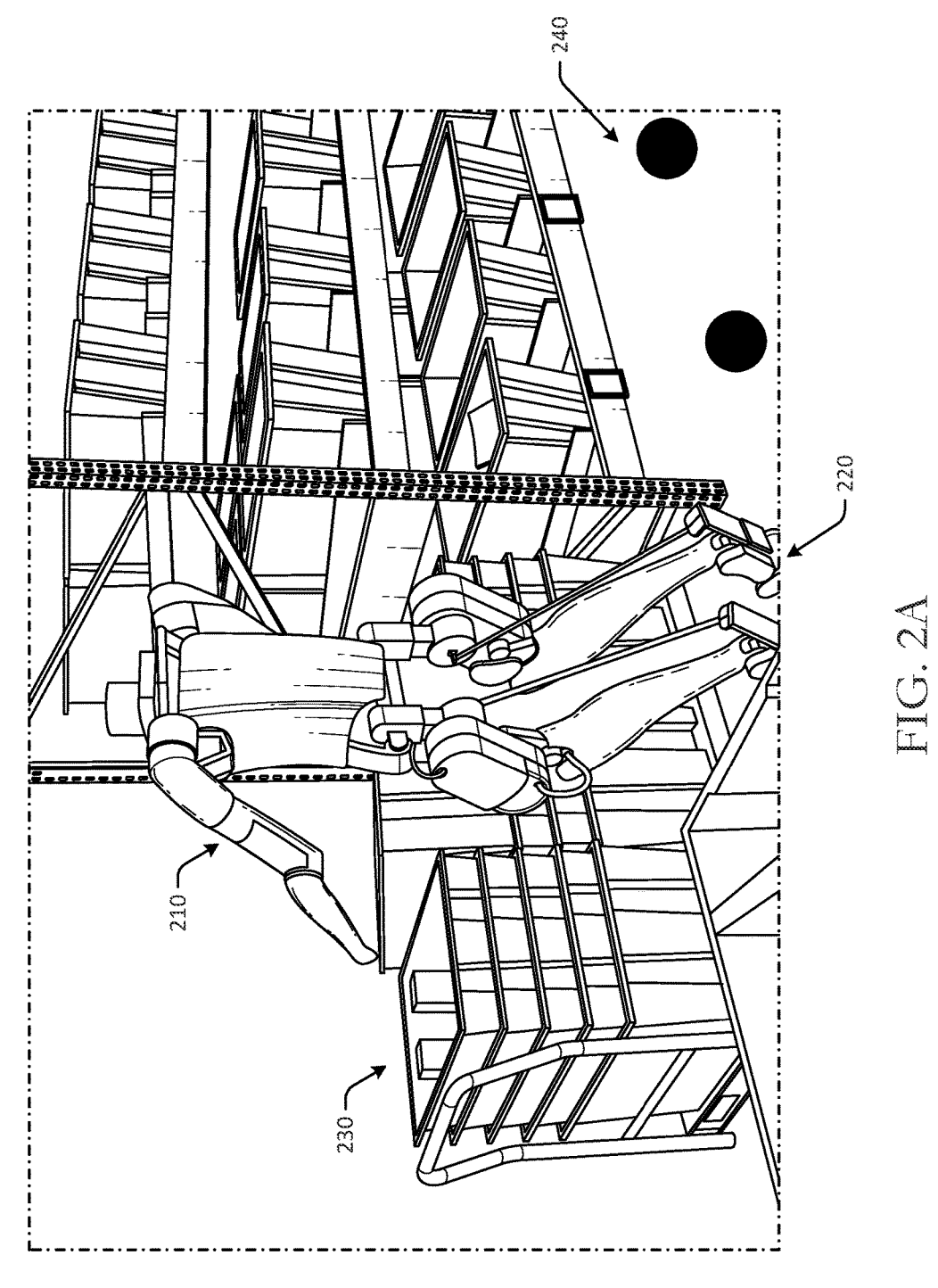
FIGS. 2A-2B are schematic illustration of industrial equipment that can be charged using wireless charging systems in accordance with one or more embodiments of the disclosure.
Figure 2B:
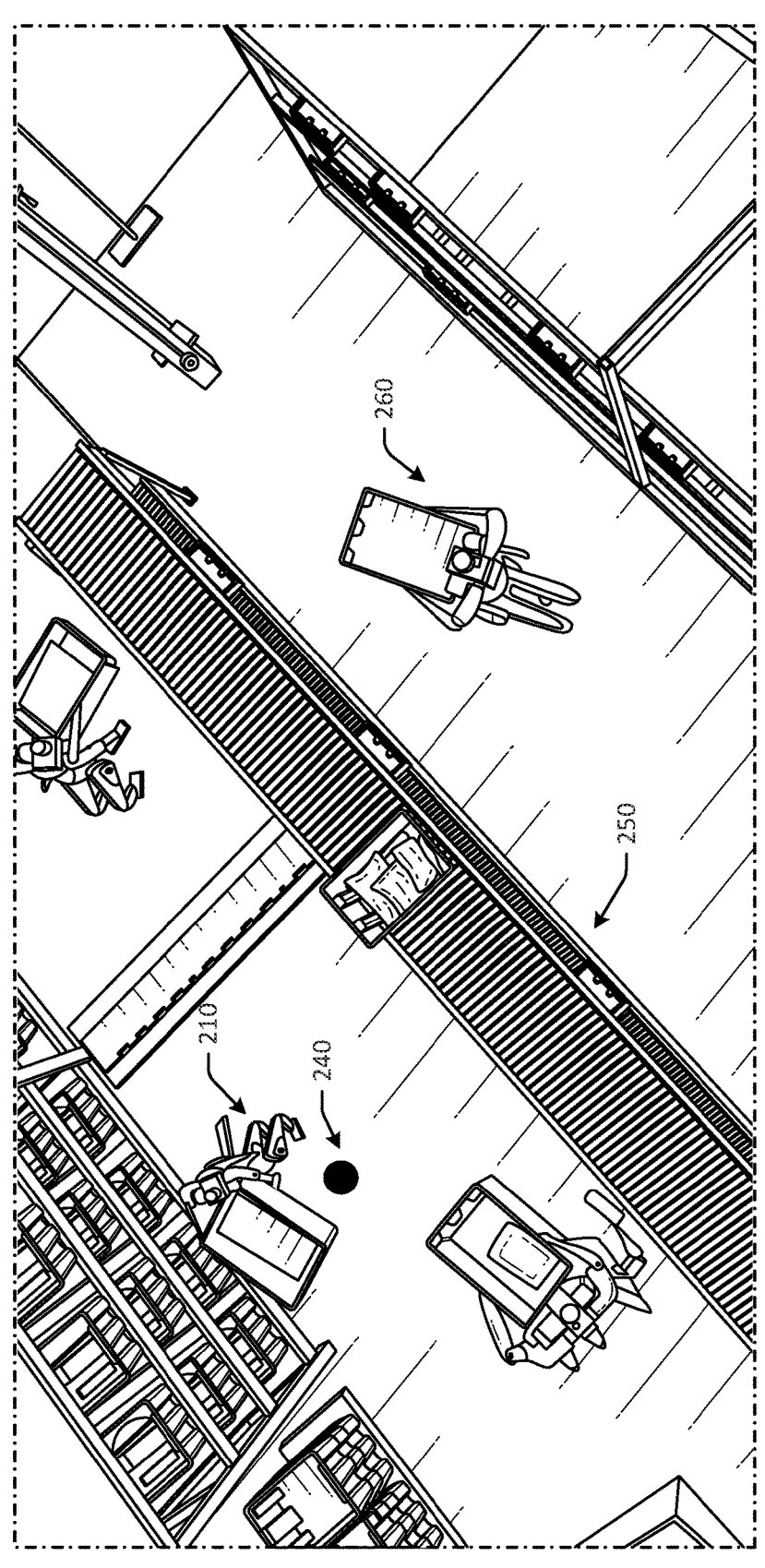

FIGS. 2A-2B are schematic illustration of industrial equipment that can be charged using wireless charging systems in accordance with one or more embodiments of the disclosure Other embodiments may include additional or fewer components. The illustration of FIGS. 2A-2B may not be to scale, and may not be illustrated to scale with respect to other figures. The system illustrated in FIGS. 2A-2B may be the same wireless charging system discussed with respect to FIG. 1.

In FIG. 2A, an example use case 200 is depicted in a fulfillment center, where a bipedal or humanoid robot 210 may be used to transport or otherwise process containers 230. The humanoid robot 210 may have one or more legs 220 with respective electrical contacts disposed thereon. The humanoid robot 210 may be charged while it performs its tasks via the electrical contacts on the one or more legs 220. In particular, a wireless charging system may include charging mats having one or more charging coils 240 on a floor of the facility, and the humanoid robot 210 may walk on the charging mats. As the humanoid robot 210 walks on the charging mats, the humanoid robot 210 may be charged wirelessly via the charging coils 240. Any number of coils may be included in a particular charging mat and/or region of a charging mat.

For example, in FIG. 2B, the humanoid robot 210 may transport a container across an inventory field, at which products or other items may be stored in inventory, to a conveyor 250. Other equipment, such as another humanoid robot 260 may be operating in the facility at the same time and may also be charged by the same charging mats and/or charging coils. Accordingly, output wattage and/or voltage for individual charging mats and/or charging coils may be adjustable and may be configured to accommodate a present situation (e.g., parameters may be increased when more than one robot or equipment is actively being charged by the same charging mat, etc.).

In the example of FIGS. 2A-2B, robots 210, 260 and other industrial equipment may be used to pick items from the inventory field and route the items for downstream processing in the fulfillment center, such as a sortation system, or a packing system. For example, the sortation system may be a system at which items picked from the inventory field may be sorted into respective totes or other containers for particular orders. The items may be sent to the sortation system for sorting into particular orders. The packing system may be a station at which one or more items associated with an order may be packed into a box or other container for shipment. A shipping label may be applied and the package may be dispatched to a loading dock or elsewhere for shipment.

In some embodiments, the system may include, or may otherwise be in communication with, a computer system or controller configured to manage charging of devices or equipment via the wireless charging system.

Accordingly, embodiments of the disclosure may provide seamless and automated wireless charging of industrial equipment while such equipment is used to perform various tasks, such as transportation of items through individual upstream/downstream processes in a fulfillment center, including picking, sortation, and so forth, and may also connect individual processes together.

Figure 3A:
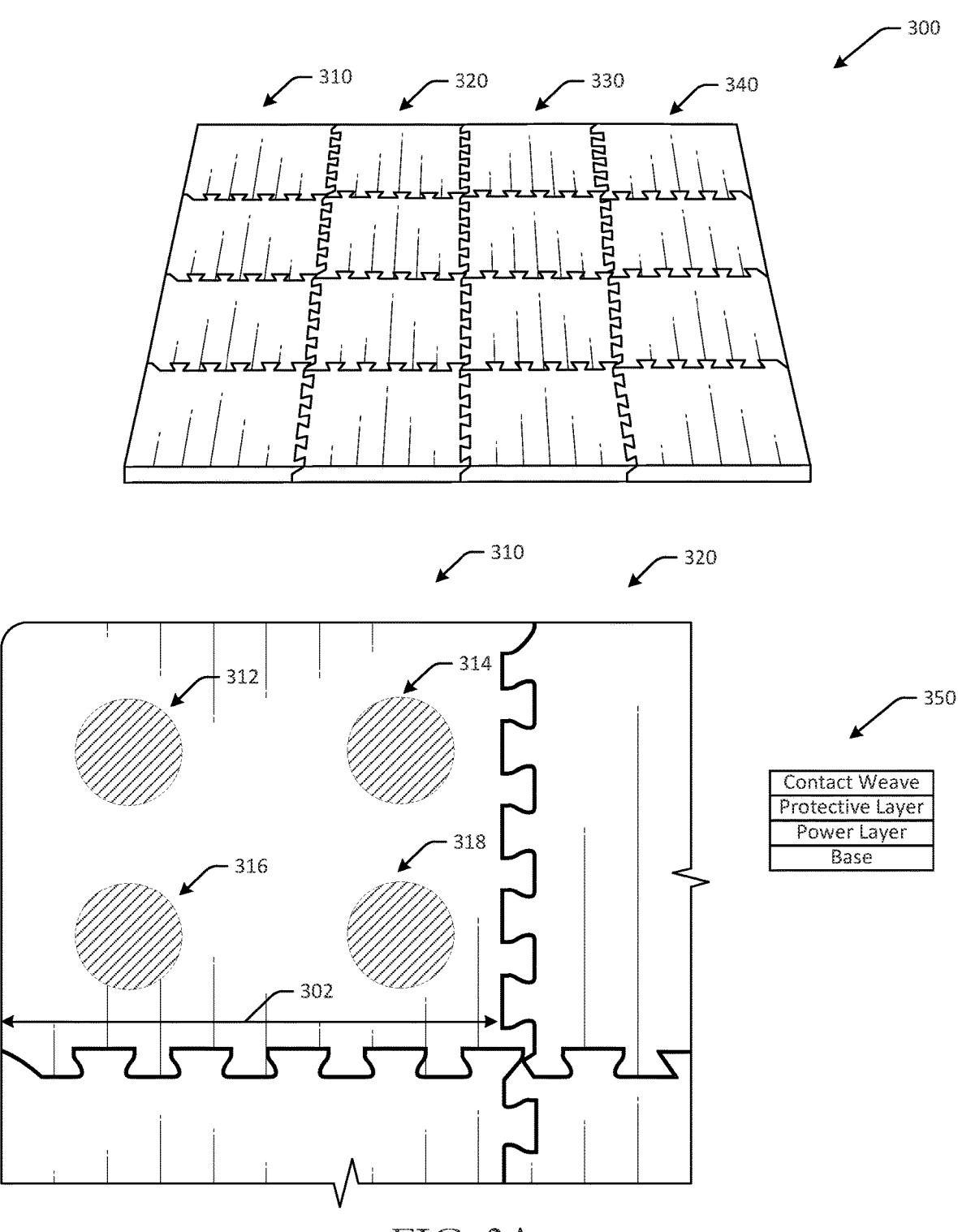
FIGS. 3A-3B are schematic illustrations of example mats and configuration settings for wireless charging of industrial equipment in accordance with one or more embodiments of the disclosure.
Figure 3B:
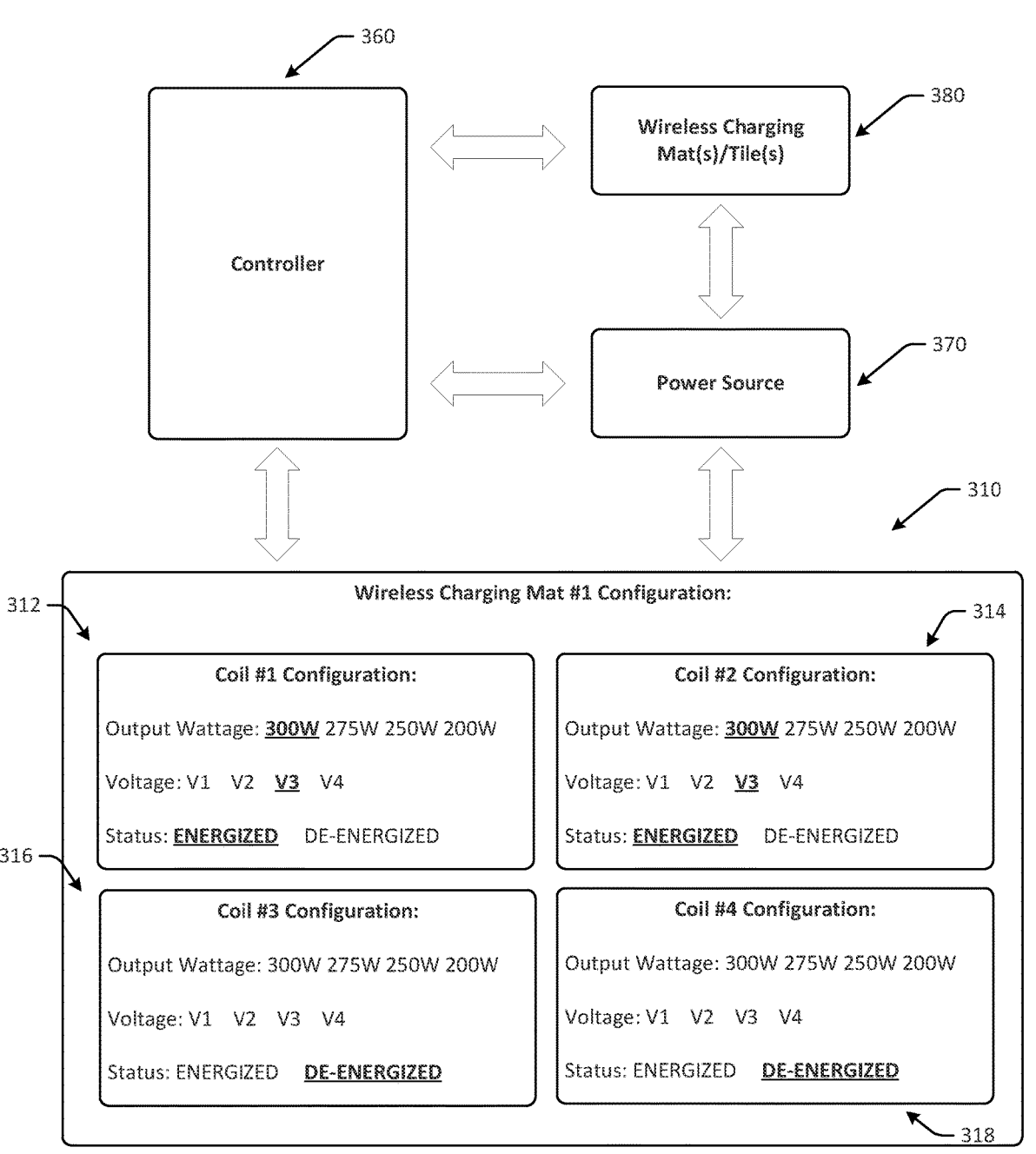

FIGS. 3A-3B are schematic illustrations of example charging mats and configuration settings for wireless charging of industrial equipment in accordance with one or more embodiments of the disclosure. Other embodiments may include additional or fewer components. The illustration of FIGS. 3A-3B are not to scale, and may not be illustrated to scale with respect to other figures. The system illustrated in FIGS. 3A-3B may be the same wireless charging system discussed with respect to FIGS. 1-2B.

In FIG. 3A, an example wireless charging system for industrial equipment 300 is depicted. The wireless charging system may include one or more charging mats, such as a first charging mat 310, a second charging mat 320 coupled to the first charging mat 310, a third charging mat 330 coupled to the second charging mat 320, a fourth charging mat 340 coupled to the third charging mat 330, and so forth. Any number of charging mats may be coupled together. The charging mats may be configured to wirelessly charge industrial equipment in contact with the respective charging mat via one or more charging coils (e.g., inductive charging coils, NFC charging coils, or any other suitable energy transfer coil, etc.). In some embodiments, the charging mats may have dimensions of 12' by 12'. Other embodiments may have different dimensions and/or non-rectangular geometries. The individual charging mats may be configured to output power by an adjustable amount of wattage, such as up to 300 watts, at different feeding levels. The charging mats may be finger safe to humans. As depicted in cross-sectional view 350, in one embodiment, the charging mats may have a base layer, a power layer at which the charging coils are disposed, a protective layer (e.g., a fluid proof layer, a waterproof or water resistant layer, etc.), and a contact weave that forms an upper part of the charging mat. In some embodiments, the protective layer may be disposed at a different position and/or one or more additional protective layers may be included. The contact weave may be a low profile and/or embedded electrical contact that allows for electrical coupling only with certain industrial equipment, and does not allow for coupling with human. Industrial equipment may have a corresponding electrical contact configured to engage with the contact weave to form a coupling and initiate energy transfer. The wireless charging system may be configured to power and/or cut power to different charging mats and/or different portions of individual charging mats to provide additional safety, reduce power consumption, and provide a zoning function. The wireless charging system may have a configurable power draw, voltage limits, and/or safety zoning.

In FIG. 3A, the wireless charging system may include the first mat 310. The first mat 310 may be configured to wirelessly charge one or more devices at the same time, such as a first device and a second device. The first mat may include a first charging coil 312, which may be an inductive coil or other type of coil, disposed in a first region of the first mat 310, a second charging coil 314 disposed in a second region of the first mat 310, a third charging coil 316 disposed in a third region of the first mat 310, and a fourth charging coil 318 disposed in a fourth region of the first mat 310. Any number of charging coils may be included. The individual coils may have the same or different sizes and/or configuration. A width 302 of the first mat 310 may be about 10', such as 12' in some embodiments. The different regions of the charging mats, such as the first mat 310, may be discrete regions in that a first magnetic field of a first charging coil does not interact with (e.g., does not overlap or interfere with, etc.) a second magnetic field of an adjacent second charging coil, etc.).

The first mat 310 may include a low profile weave that forms an electrical contact, as depicted in the cross-sectional view 350. The first mat 310 may include one or more liquid proof barriers, such as a liquid proof barrier disposed adjacent to (e.g., above, below, etc.) the first charging coil 312 and the second charging coil 314. The low profile weave may be embedded into the surface of the charging source, while preventing radio waves above the surface of the first mat 310.

The other mats of the wireless charging system may be configured the same or different than the first mat 310. For example, the second mat 320 may be removably coupled to the first mat 310, and the second mat 320 may be configured to wirelessly charge the first device and the second device at the same time.

In FIG. 3B, the wireless charging system may include one or more controllers 360 configured to control operation of the system, such as operation of the one or more charging mats. The controller 360 may be coupled to the first mat 310, as well as one or more additional charging tiles or mats 380 (which may include the second mat 320, the third mat 330, the fourth mat 340, etc.). The controller 360 may be optionally coupled to a power source 370 and may control the delivery of power from the power source 370 to the charging mats. The power source 370 may be an industrial power source, a wall outlet (120V or 240V) power source, a battery power source, or another type of power source.

The controller 360 may control operation of the charging mats. For example, the controller 360 may be configured to determine a configuration of individual charging coils of a charging mat. In the example of FIG. 3B, the controller 360 may set a configuration of the first charging coil 312 of the first mat 310 to have an output wattage of 300 Watts, a voltage setting of V3, and a status of energized (e.g., the first charging coil 312 is being provided energy from the power source 370, etc.). The controller 360 may set a configuration of the second charging coil 314 of the first mat 310 to have an output wattage of 300 Watts, a voltage setting of V3, and a status of energized (e.g., the second charging coil 314 is being provided energy from the power source 370, etc.). The controller 360 may set a configuration of the third charging coil 316 of the first mat 310 to have no output wattage or voltage, and a status of de-energized or inactive. The controller 360 may set a configuration of the fourth charging coil 318 of the first mat 310 to have no output wattage or voltage, and a status of de-energized or inactive. The controller 360 may determine the configuration for the individual coils based upon predetermined selectable options, or may configure based on real-time usage data (e.g., the number of devices coupled to a coil, etc.).

In one example, the controller may control operation of the charging coils of the first mat 310 by determining, at a first time, that a first device is in contact with the first region of the first mat 310, and causing the first charging coil 312 to be energized for wireless charging of the first device. The controller 360 may determine, at a second time, that the first device is not in contact with the first region of the first mat 310, and may therefore cause the first charging coil 312 to be de-energized (e.g., after the device is gone, etc.).

The controller 360 may cause coils to be powered or energized as needed. For example, the controller 360 may determine, at a second time, that the second device is in contact with the second region of the first mat 310, and may determine, at the second time, that the first device is also in contact with the second region of the first mat 310. The controller may therefore cause the second charging coil 314 to be energized for wireless charging of the first device and the second device at the same time. Once devices are de-coupled, the controller 360 may cause the charging coil(s) to be de-energized. The controller 360 may also adjust an output voltage associated with the first charging coil 312, such as depending on the type of device being charged by the first charging coil 312. Similarly, the controller 360 may determine an output wattage value associated with a device being charged by the first coil 312, and may cause the first charging coil 312 to output a number of watts corresponding to the output wattage value.

FIG. 4 is an example process flow 400 for wireless charging of industrial equipment in accordance with one or more embodiments of the disclosure. Although certain operations are illustrated as occurring separately in FIG. 4, some or all of the operations may occur concurrently or partially concurrently across one or more computer systems. One or more operations may be optional in FIG. 4. The process flow 400 may be performed by a controller or computer system associated with a wireless charging system for industrial equipment.

At block 410 of the process flow 400, it may be determined, at a first time by a controller of a wireless charging system, that a first device is in contact with a first region of a wireless charging mat, the wireless charging mat comprising a first charging coil disposed in a first region of the first mat, and a second charging coil disposed in a second region of the first mat. For example, a controller may determine, at a first time, that a first device is in contact with a first region of a wireless charging mat, the wireless charging mat comprising a first charging coil disposed in a first region of the first mat, and a second charging coil disposed in a second region of the first mat. The controller may detect the presence of the first device via coupling of an electrical contact of the device with a charging coil of the wireless charging mat. The first device may be a standalone device or part of a device, such as a leg of a bipedal robot. More than one device and/or leg of a robot may be charged at the same time by the same charging mat and/or charging coil.

At block 420 of the process flow 400, the first charging coil may be caused to be energized for wireless charging of the first device. For example, the controller may cause the first charging coil to be energized for wireless charging of the first device. The coils may have configurable or selective energizing and de-energizing. The controller may regulate energizing of coils. For example, because a device is coupled to a coil, the controller may energize the coil so as to charge the coupled device.

At block 430 of the process flow 400, the second charging coil may be caused to be de-energized. For example, a controller may cause the second charging coil to be de-energized. In some embodiments, unused coils may be de-energized to route power to other coils that are being used and/or to conserve power. In one example, because no device is coupled to the second charging coil, the second charging coil may be de-energized.

At block 440 of the process flow 400, it may be determined, at a second time, that the first device is not in contact with the first region of the first mat. For example, a controller may determine, at a second time, that the first device is not in contact with the first region of the first mat. After the first device moves on (e.g., past the first region of the first mat, etc.), the first device may no longer be in contact with the first region of the first mat. The controller may determine the first device is no longer in contact with the first region of the first mat based at least in part on a coupling strength (e.g., low strength may indicate the first device has moved too far, etc.).

At block 450 of the process flow 400, the first charging coil may be caused to be de-energized. For example, a controller may cause the first charging coil to be de-energized. When the first device and/or no other devices are coupled to the first charging coil for charging, the controller may de-energize or temporarily disable the first charging coil, so as to route power elsewhere if needed.

In this manner, the coils of the wireless charging system can be selectively energized and de-energized to maximize charging of devices and to conserve energy where applicable. In addition, as equipment moves across the charging mat(s), coils can be energized as needed to charge the device as the device moves across the mat. In another example, the controller may determine, at the second time, that a second device is in contact with the second region of the first mat.

The controller may determine, at the second time, that the first device is in contact with the second region of the first mat, and the device may cause the second charging coil to be energized for wireless charging of the first device and the second device at the same time.

Figure 5:
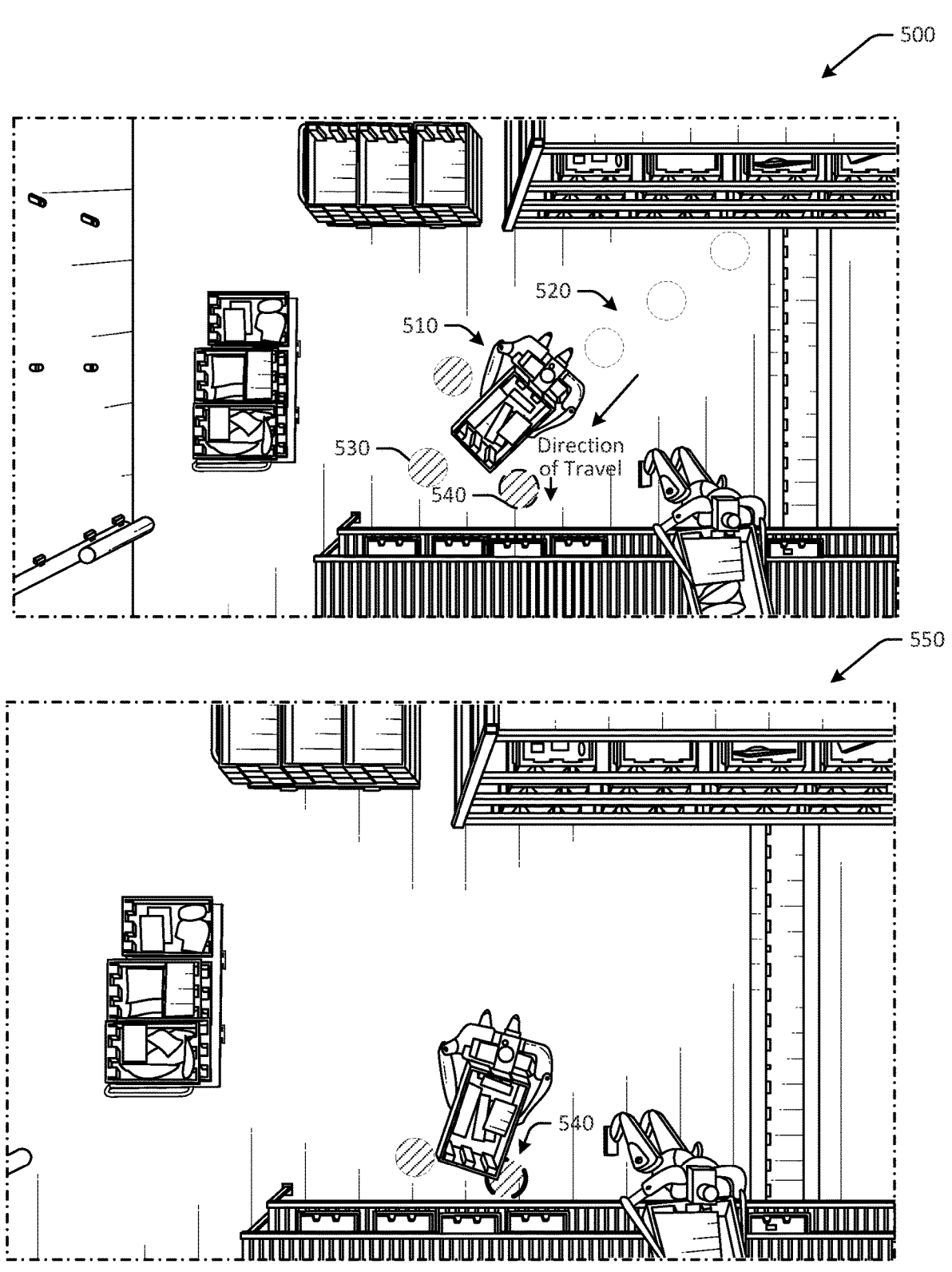
FIG. 5 is a schematic illustration of an example use case for selective activation of charging coils in accordance with one or more embodiments of the disclosure.

FIG. 5 is a schematic illustration of an example use case 500 for selective activation of charging coils in accordance with one or more embodiments of the disclosure. Other embodiments may include additional or fewer components. The illustration of FIG. 5 is not to scale, and may not be illustrated to scale with respect to other figures. The system illustrated in FIG. 5 may be the same wireless charging system discussed with respect to FIGS. 1-4.

In FIG. 5, an example embodiment may include intelligent activation or energizing of charging coils based at least in part on predictive movement of equipment. For example, a humanoid robot 510 may be moving across one or more charging mats of a wireless charging system. Based at least in part on a sequence of charging coils 520 that were energized responsive to the robot's previous steps (e.g., the last 3 coils that the robot was charged by, etc. any number of historical coils may be used), a controller may determine a direction of travel of the robot 510. Based at least in part on the direction of travel, the controller may determine one or more charging coils 530, 540 that may be energized before the robot 510 comes into contact with the region and/or couples to the coil, so as to increase a charging time. In the example of FIG. 5, as the robot 510 continues walking across the environment, the controller may predict that the robot will next interact with charging coil 530 or 540. The controller may cause one or both charging coils 530, 540 to be energized. At a second point in time 550, the robot 510 may couple to charging coil 540. Because the charging coil 540 was already energized, charging may start immediately.

Accordingly, the controller may determine that a direction of travel of a device is toward a particular region of a particular charging mat, and may cause an associated charging coil to be energized for wireless charging of the device when the device is no longer in contact with a previous charging coil.

Figure 6:
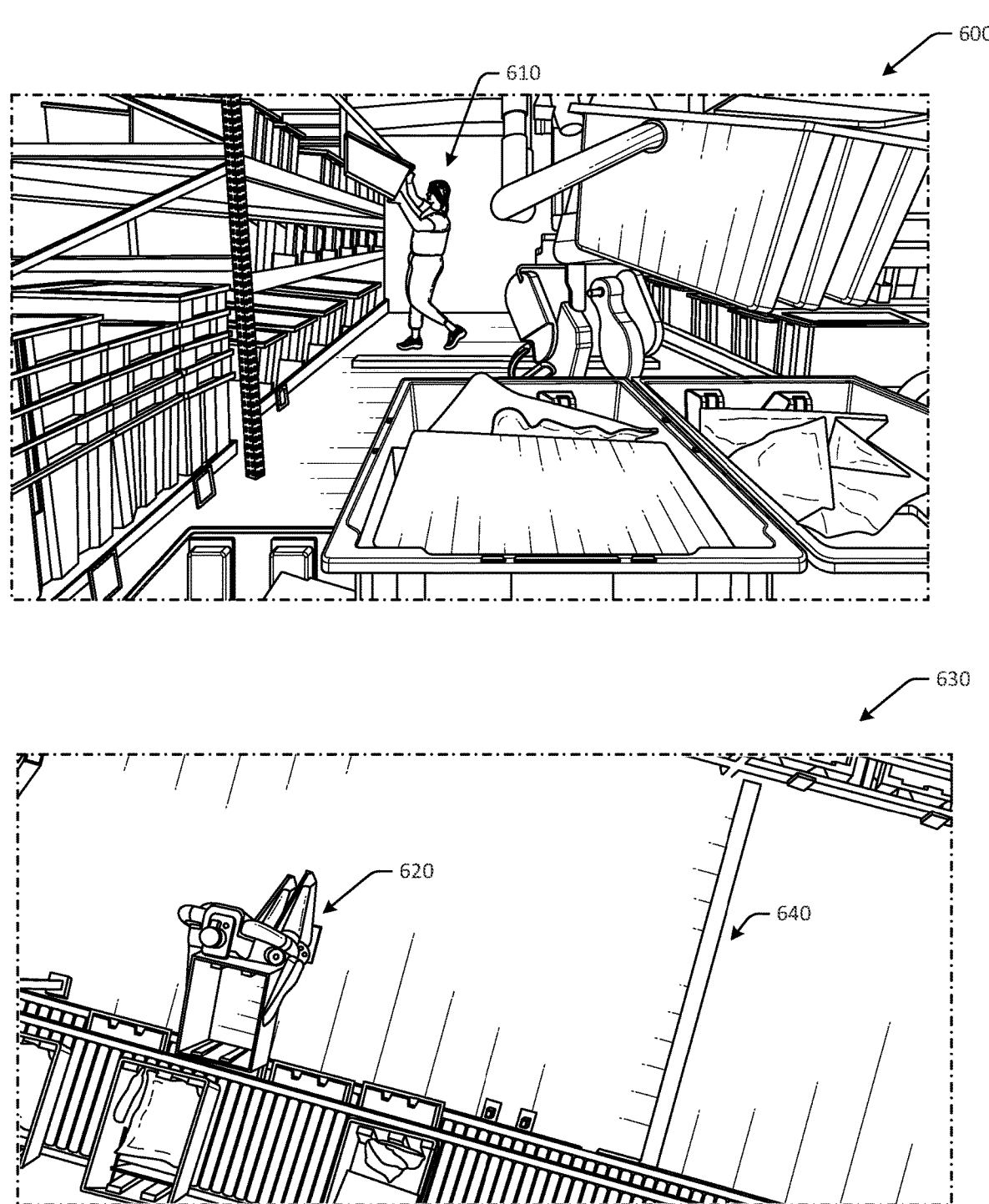
FIG. 6 is a schematic illustration of an example use case for combined device and human interaction with a charging system in accordance with one or more embodiments of the disclosure.

FIG. 6 is a schematic illustration of an example use case 600 for combined device and human interaction with a charging system in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same wireless charging system discussed with respect to FIGS. 1-5.

As depicted in FIG. 6, the wireless charging system may be safe for simultaneous usage by humans and robots or other industrial equipment. A human 610 and a robot 620 may work together on the wireless charging mat at the same time without any issues. Due to the low profile weave electrical contact, only the robot 620 may be charged by the charging mat.

In another use case 630, in some embodiments, a gap 640 may separate a first wireless charging mat from a second charging mat. The robot 620 may be configured to avoid stepping on the gap 640, so as to avoid losing power in instances where the robot 620 does not have an onboard battery. For example, the robot 620 or other device may be configured to avoid the gap 640 between the first mat and the second mat.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
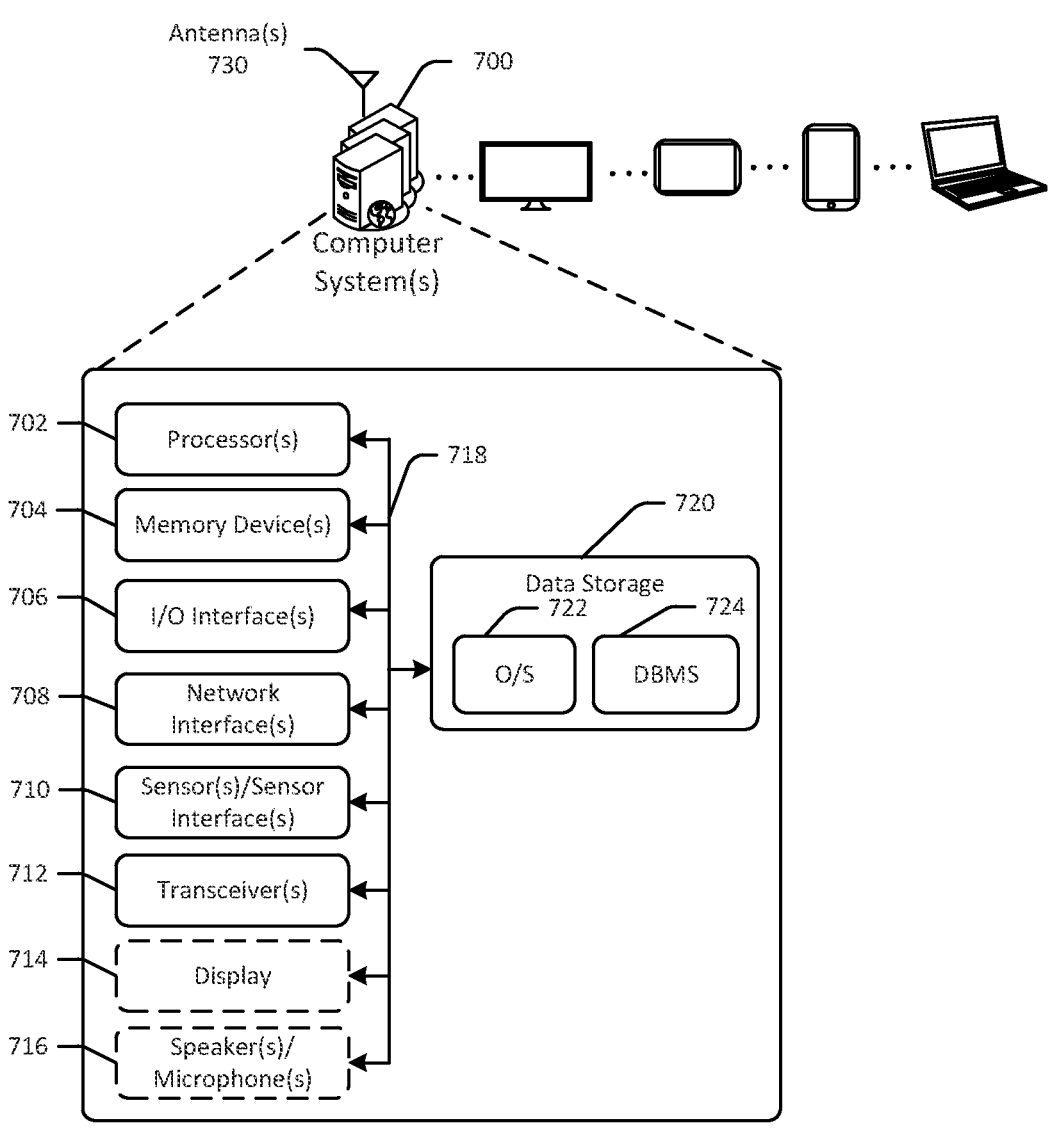
FIG. 7 schematically illustrates an example architecture of a computer system associated with a wireless charging of industrial equipment system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the device(s) of FIGS. 1-6. For example, the computer system(s) 700 may be a controller and may control one or more aspects of the wireless charging of industrial equipment system described in FIGS. 1-6.

The computer system(s) 700 may be configured to communicate with one or more servers, user devices, or the like. The computer system(s) 700 may be configured to identify items, retrieve items, move items, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s)

or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A wireless charging system comprising:
a bipedal robot comprising a first leg having a first electrical contact, and a second leg having a second electrical contact;
a first mat configured to wirelessly charge the bipedal robot via the first electrical contact and the second electrical contact, the first mat comprising:
a first inductive coil disposed in a first region of the first mat; and
a second inductive coil disposed in a second region of the first mat;
a second mat coupled to the first mat, the second mat configured to wirelessly charge the bipedal robot via the first electrical contact and the second electrical contact, the second mat comprising:
a third inductive coil disposed in a first region of the second mat; and
a fourth inductive coil disposed in a second region of the second mat; and
a controller configured to:
determine, at a first time, that the first device is in contact with the first region of the first mat;
cause the first inductive coil to be energized for wireless charging of the first device;
cause the second inductive coil to be de-energized;

determine that a direction of travel of the first leg is toward the second region based at least in part on the first coil being energized; and
in response to determining that the direction of travel of the first leg is toward the second region, cause the second inductive coil to be energized for wireless charging of the first leg before the first leg is in contact with the second region of the first mat.

2. The system of claim 1, wherein the controller is further configured to:
determine, at a second time, that the second electrical contact is in contact with the second region of the first mat;
determine, at the second time, that the first electrical contact is in contact with the second region of the first mat; and
cause the second inductive coil to be energized for wireless charging of the bipedal robot via the first electrical contact and the second electrical contact.

3. The system of claim 1, wherein the controller is further configured to:
determine an output wattage value associated with the bipedal robot; and
cause the first inductive coil to output a number of watts corresponding to the output wattage value.

4. A system comprising:
a first mat configured to wirelessly charge a first device and a second device, the first mat comprising:
a first charging coil disposed in a first region of the first mat; and
a second charging coil disposed in a second region of the first mat, wherein the first region and second region are discrete regions; and
a controller configured to:
determine, at a first time, that the first device is in contact with the first region of the first mat;
cause the first charging coil to be energized for wireless charging of the first device;
determine that a direction of travel of the first device is toward the second region based at least in part on the first coil being energized; and
in response to determining that the direction of travel of the first device is toward the second region, cause the second inductive coil to be energized for wireless charging of the first device before the first device is in contact with the second region of the first mat.

5. The system of claim 4, wherein a first magnetic field of the first charging coil does not interact with a second magnetic field of the second charging coil, and wherein the controller is further configured to:
cause the second charging coil to be de-energized.

6. The system of claim 4, wherein the controller is further configured to:
determine an output wattage value associated with the first device; and
cause the first charging coil to output a number of watts corresponding to the output wattage value.

7. The system of claim 4, wherein the controller is further configured to:
adjust an output voltage associated with the first charging coil.

8. The system of claim 4, further comprising:
a second mat removably coupled to the first mat, the second mat configured to wirelessly charge the first device and the second device;
wherein the controller is further configured to control operation of the second mat.

9. The system of claim 8, further comprising the first device, wherein the first device is configured to avoid a gap between the first mat and the second mat.

10. The system of claim 4, wherein the controller is further configured to:

determine, at a second time, that the second device is in contact with the second region of the first mat;

determine, at the second time, that the first device is in contact with the second region of the first mat; and cause the second charging coil to be energized for wireless charging of the first device and the second device.

11. The system of claim 4, wherein the first device is a first leg of a humanoid robot, and the second device is a second leg of the humanoid robot.

12. The system of claim 4, wherein the controller is further configured to:

determine, at a second time, that the first device is not in contact with the first region of the first mat; and cause the first charging coil to be de-energized.

13. The system of claim 4, wherein the first mat further comprises:

a low profile weave that forms an electrical contact; and a liquid proof barrier disposed adjacent to the first charging coil and the second charging coil.

14. A method comprising:

determining, at a first time by a controller of a wireless charging system, that a first device is in contact with a first region of a wireless charging mat, the wireless charging mat comprising a first charging coil disposed in a first region of a first mat, and a second charging coil disposed in a second region of the first mat;

causing the first charging coil to be energized for wireless charging of the first device;

causing the second charging coil to be de-energized;

determining, at a second time, that the first device is not in contact with the first region of the first mat; and causing the first charging coil to be de-energized;

determining that a direction of travel of the first device is toward the second region; and causing the second charging coil to be energized for wireless charging of the first device before the first device is in contact with the second region of the first mat.

15. The method of claim 14, further comprising:

determining, at the second time, that the second device is in contact with the second region of the first mat;

determining, at the second time, that the first device is in contact with the second region of the first mat; and causing the second charging coil to be energized for wireless charging of the first device and the second device.

16. The method of claim 14, further comprising:

adjusting an output voltage associated with the first charging coil.

17. The method of claim 14, further comprising:

determining an output wattage value associated with the first device; and causing the first charging coil to output a number of watts corresponding to the output wattage value.

* * * * *